(12) United States Patent
Martin

(10) Patent No.: US 8,549,389 B2
(45) Date of Patent: Oct. 1, 2013

(54) SYSTEMS AND METHODS FOR 1553 BUS OPERATION SELF CHECKING

(75) Inventor: Kenneth Lee Martin, St Pete, FL (US)

(73) Assignee: Honeywell International Inc., Morristown, NJ (US)

(*) Notice: Subject to any disclaimer, the term of this patent is extended or adjusted under 35 U.S.C. 154(b) by 219 days.

(21) Appl. No.: 13/114,673

(22) Filed: May 24, 2011

(65) Prior Publication Data

US 2012/0304017 A1 Nov. 29, 2012

(51) Int. Cl.
*G06F 7/02* (2006.01)
*G01R 31/28* (2006.01)

(52) U.S. Cl.
USPC .................. 714/820; 714/733; 714/819

(58) Field of Classification Search
USPC ............. 714/43, 820, 712, 10, 100, 733, 734, 714/724, 819, 725
See application file for complete search history.

(56) References Cited

U.S. PATENT DOCUMENTS

| | | | | |
|---|---|---|---|---|
| 4,901,348 A | * | 2/1990 | Nichols et al. | 726/13 |
| 5,790,776 A | * | 8/1998 | Sonnier et al. | 714/10 |
| 5,838,894 A | | 11/1998 | Horst | |
| 6,157,967 A | * | 12/2000 | Horst et al. | 710/19 |
| 6,496,940 B1 | * | 12/2002 | Horst et al. | 714/4.3 |
| 6,948,092 B2 | * | 9/2005 | Kondo et al. | 714/12 |
| 7,124,319 B2 | * | 10/2006 | Watkins et al. | 714/12 |
| 2006/0085692 A1 | | 4/2006 | Berbaum et al. | |

FOREIGN PATENT DOCUMENTS

EP 0398694 11/1990

OTHER PUBLICATIONS

Francois, "Study on I/O in Time and Space Partitioned Systems", Nov. 2008, pp. 1-64, Publisher: National Aerospace Laboratory NLR.
"Q104-1553 High Density PC/104-Plus Interface", 2007, pp. 1-2, Publisher: GE Fanuc Embedded Systems.
"OPCX-1553 High-Density PCI Interface", 2007, pp. 1-2, Publisher: GE Fanuc Intelligent Platforms.
Kwiat, "Efficient Hardware Fault Tolerance Using Field-Programmable Gate Arrays", "Proceedings ISSAT International Conference on Reliability and Quality in Design", 1995, pp. 1-11.
"Redundant Launch Vehicle Guidance (RLVG)", "Aerospace Electronic Systems Defense & Space Electronic Systems", Sep. 2003, pp. 1-2, Publisher: Honeywell.
European Patent Office, "Office Action", "from Foreign Counterpart of U.S. Appl. No. 13/114,673", Oct. 8, 2012, pp. 1-5, Published in: EP, (Application No. 12 160 456.5).

(Continued)

*Primary Examiner* — Phung M Chung
(74) *Attorney, Agent, or Firm* — Fogg & Powers LLC

(57) ABSTRACT

Systems and methods for 1553 bus operation self checking are provided. In one embodiment, a fault tolerant computer comprises a self-checking processor pair that includes a master processor, a checking processor, and self-checking pair logic; a 1553 bus transceiver; and a device comprising 1553 self-checking logic coupled between the self-checking processor pair and the 1553 bus transceiver, wherein the 1553 self-checking logic manages data communication between the 1553 bus transceiver and the self-checking processor pair. The 1553 self-checking logic includes a primary logic and a secondary logic that operate in lock-step. When the 1553 self-checking logic writes data to the 1553 bus transceiver, the 1553 self-checking logic compares a first 1553 formatted message generated by the primary logic to a second 1553 formatted message generated by the secondary logic, and generates an error indication when the first 1553 formatted message does not match the second 1553 formatted message.

20 Claims, 4 Drawing Sheets

(56) References Cited

OTHER PUBLICATIONS

European Patent Office, "European Search Report", "from Foreign Counterpart of U.S. Appl. No. 13/114,673", Sep. 24, 2012, pp. 1-4, Published in: EP, (EP 12 16 0456).

European Patent Office, "Communication under Rule 71(3) EPC", "from Foreign Counterpart of U.S. Appl. No. 13/114,673", Mar. 25, 2013, pp. 1-28, Published in: EP, (EP 12 160 456.5-1960).

* cited by examiner

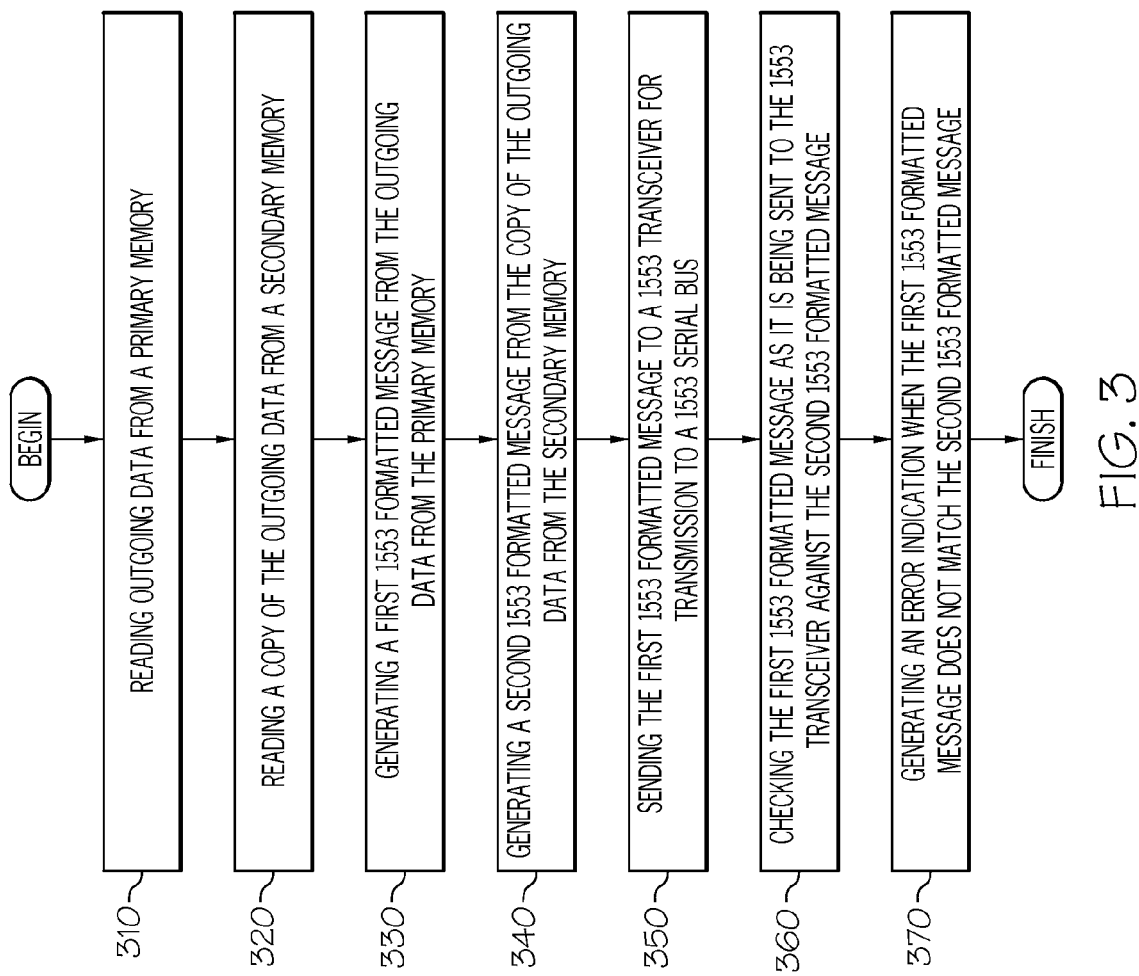

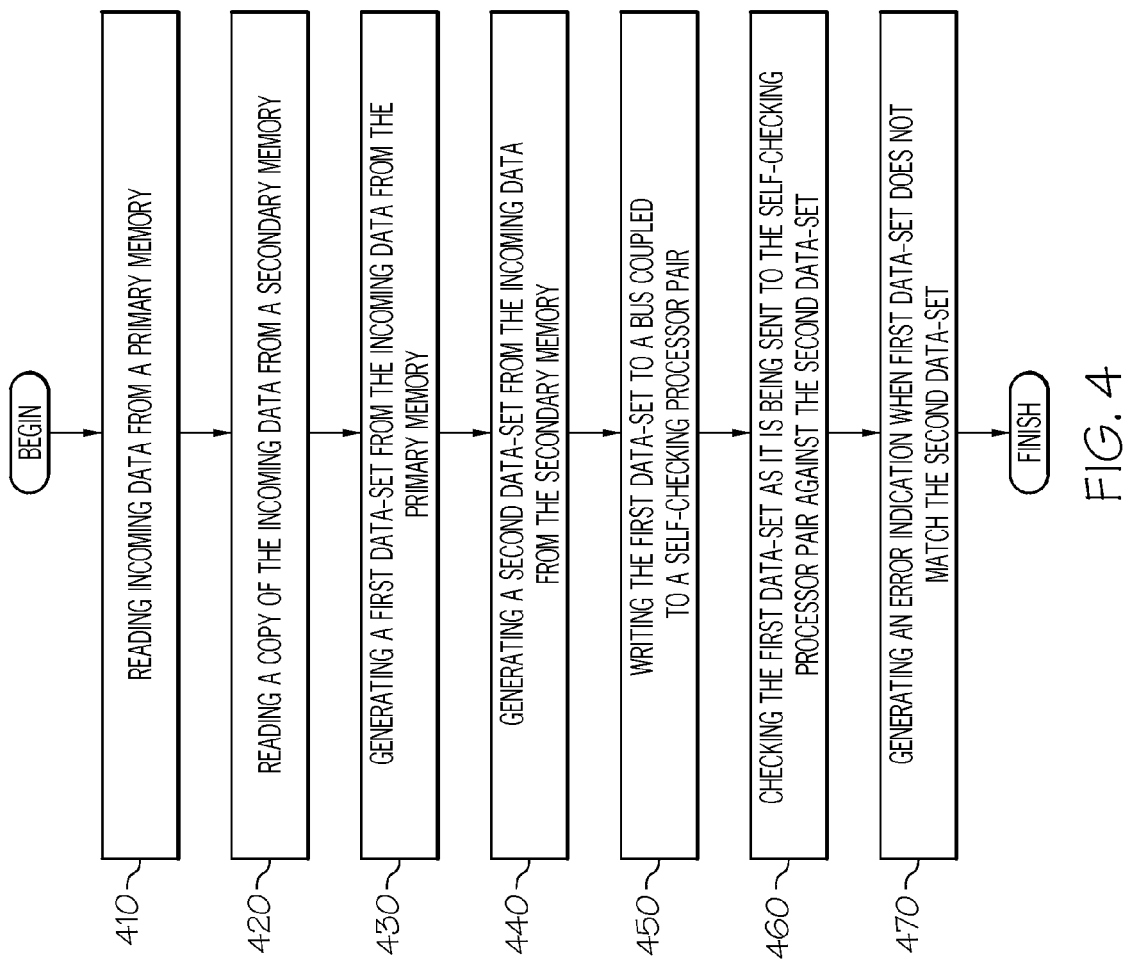

SYSTEMS AND METHODS FOR 1553 BUS OPERATION SELF CHECKING

BACKGROUND

For certain critical systems, the transmission of undetected erroneous information between system components is intolerable. The introduction of designs such as fault tolerant computing systems using processors configured as self-checking pairs and MIL-STD-1553 serial bus standards have provided improved means for detecting and reacting to data faults. However, for certain applications such as manned space launch vehicles, the desire exists to continue to improve the safety and reliability of these vehicles by still further reducing the instances of processing using undetected faulted data.

For the reasons stated above and for other reasons stated below which will become apparent to those skilled in the art upon reading and understanding the specification, there is a need in the art for improved systems and methods for 1553 bus operation self checking.

SUMMARY

The Embodiments of the present invention provide methods and systems for 1553 Bus operation self checking and will be understood by reading and studying the following specification.

Systems and methods for 1553 bus operation self checking are provided. In one embodiment, a fault tolerant computer comprises a self-checking processor pair that includes a master processor, a checking processor, and self-checking pair logic; a 1553 bus transceiver; and a device comprising 1553 self-checking logic coupled between the self-checking processor pair and the 1553 bus transceiver, wherein the 1553 self-checking logic manages data communication between the 1553 bus transceiver and the self-checking processor pair. The 1553 self-checking logic includes a primary logic and a secondary logic that operate in lock-step. When the 1553 self-checking logic writes data to the 1553 bus transceiver, the 1553 self-checking logic compares a first 1553 formatted message generated by the primary logic to a second 1553 formatted message generated by the secondary logic, and generates an error indication when the first 1553 formatted message does not match the second 1553 formatted message.

DRAWINGS

Embodiments of the present invention can be more easily understood and further advantages and uses thereof more readily apparent, when considered in view of the description of the preferred embodiments and the following figures in which:

FIG. 3 is a block diagram of a method of one embodiment of the present invention; and FIG. 4 is a block diagram of a method of one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the needs discussed above by implementing a self-checking data verification scheme at a point where data is being written to a MIL-STD-1553 bus, or has just been read from a MIL-STD-1553 bus. When combined with technologies such as self-checking pair processing, embodiments of the present invention significantly increase reliability by reducing the occurrence of undetected erroneous information transfers between system components.

Figure 1:
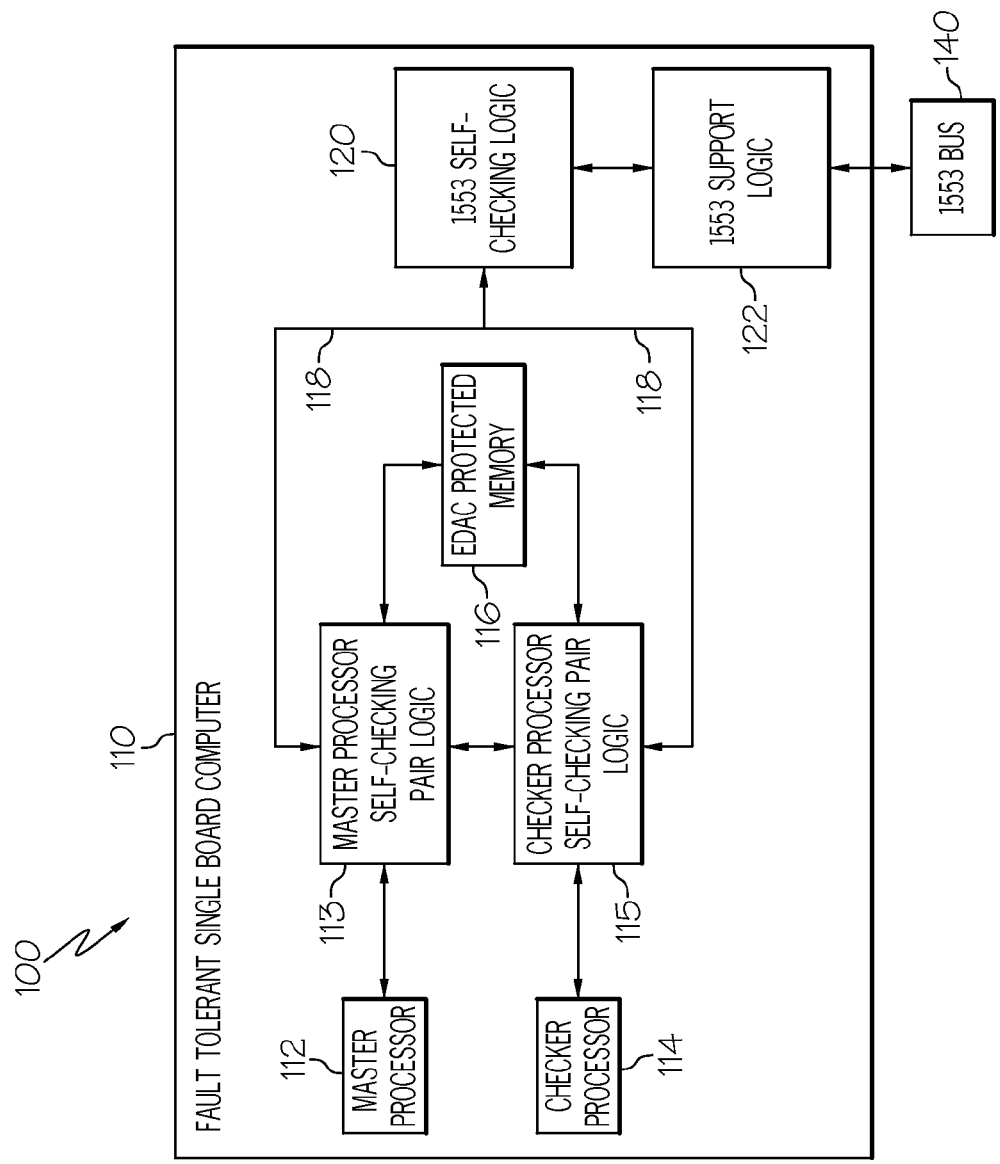
FIG. 1 is a block diagram of a fault tolerant single board computer of one embodiment of the present invention.

FIG. 1 is a block diagram generally at 100 of a fault tolerant single board computer 110 of one embodiment of the present invention that is coupled to, and sends and receives data over a MIL-STD-1553 serial data bus illustrated in FIG. 1 as 1553 Bus 140. Computer 110 comprises a first (or "Master") processor 112 and a second (or "Checker") processor 114. The master processor 112 and checker processor 114 work in parallel performing the same operations in a lock-step fashion configuration commonly known by those of skill in the art as a self-checking processor pair. Self-checking between the two processors is facilitated by the Master Processor Self-Checking Pair Logic 113 and Checker Processor Self-Checking Pair Logic 115 which are respectively coupled to the master processor 112 and checker processor 114. Through the Self-Checking Pair Logic 113 and 115, processors 112 and 114 access error detection and correction (EDAC) Protected Memory 116.

In operation, processors 112 and 114 perform the same operation on the same data in a lock-step fashion. For example, in one embodiment in operation, an item of sensor data that is ready for processing is available in EDAC Protected Memory 116. Master processor 112 and checker 114 both read in the item of sensor data. While master processor 112 applies an algorithm to the sensor data, checker processor 114 applies the same algorithm to the same sensor data. When the calculations by processors 112 and 114 are complete, the results are provided to self-Checking Pair Logic 113 and 115 which compare the results. When the results do not agree, an error is reported back to processors 112 and 114 where one or more error recovery schemes are initiated. Such schemes are known to those in the art of fault-tolerant self-checking pair computing technologies and for that reason are not repeated herein. In other words, during normal operation, master processor 112 is the device that produces a data output that will be externally used for some purpose. While checking processor performs the same calculations as master processor 114, its computational results are used solely to validate the data output provided by master processor 112. When the results from the two processors 112 and 114 agree, they are saved back to EDAC Protected Memory 116 and/or designated for transmission to other systems via 1553 Bus 140.

In one embodiment the master and checker processors 112 and 114 are each implemented using a MIL-STD-1750A specification processor such as, but not limited to, the Honeywell Generic Very High Speed Integrated Circuit Spaceborne Computers (GVSC). In one embodiment, the self-Checking Pair Logic 113 and 115 are each implemented using hardware conforming to the same specification, such as the Honeywell Enhance Memory I/O Controller (EMIOC).

When processors 112 and 114 decide that data needs to be provided to one or more external devices via the external 1553 Bus 140, processor 112 provides the data to self-Checking Pair Logic 113, which writes the information to an internal bus 118 which couples the self-checking processor pair to 1553 Self-Checking Logic device 120. Through an echo feature described below, self-Checking Pair Logic 115 observes the data provided to 1553 Self-Checking Logic device 120 and verifies that it agrees with the data provided by comparing it to the results of a parallel operation performed by processor 114. After agreement is verified, 1553 Self-Checking Logic device 120 is instructed to transmit the data via 1553 Bus 140. The operation of 1553 Self-Checking Logic device 120 in response to receiving the data is next explained below with reference to FIG. 2.

Figure 2:
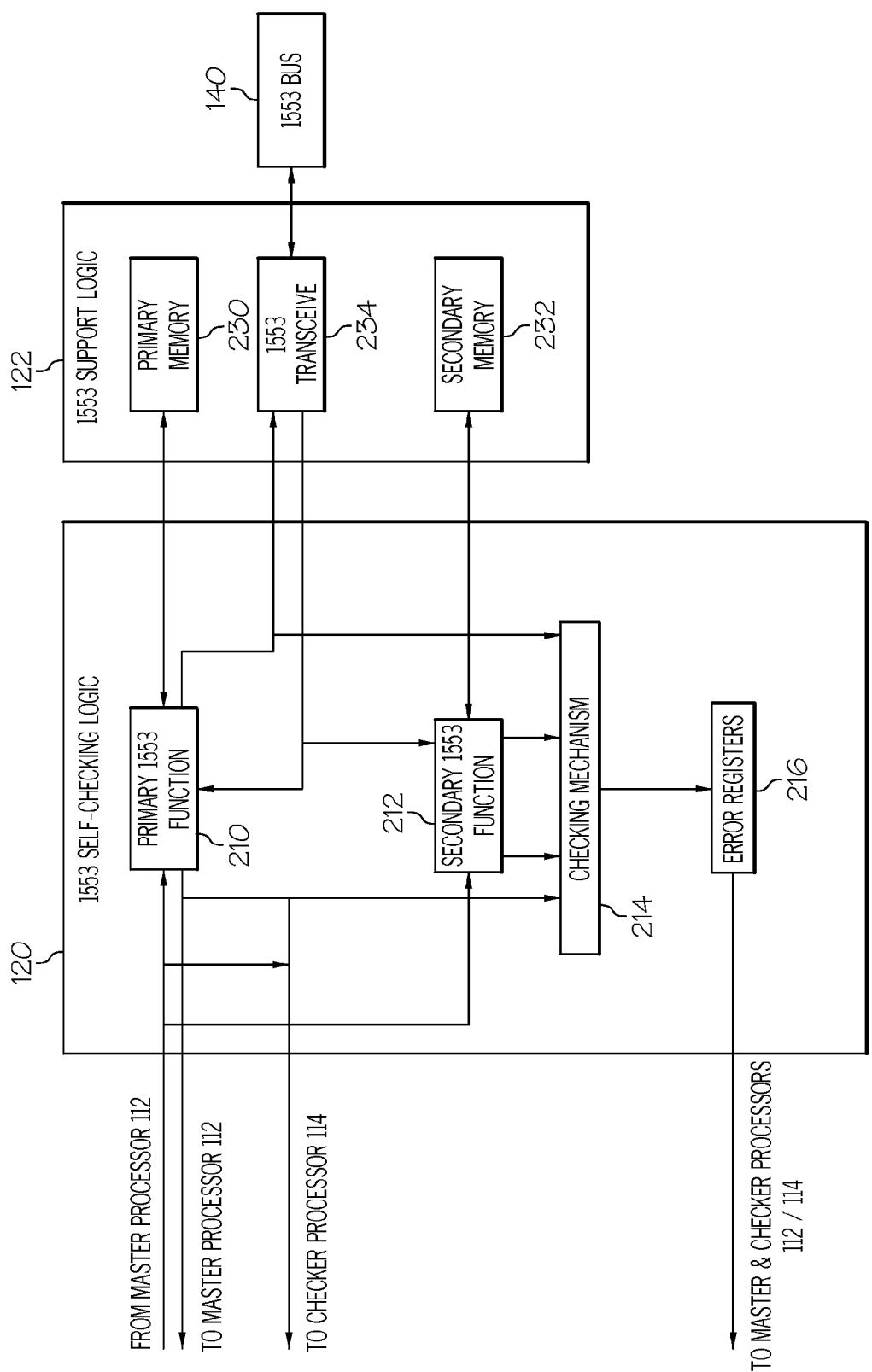
FIG. 2 is a block diagram of a 1553 self-checking logic of one embodiment of the present invention.

FIG. 2 is a block diagram providing a more detailed illustration of 1553 Self-Checking Logic device 120 and 1553 Support Logic 122 for one embodiment of the present invention. 1553 Self-Checking Logic device 120 comprises primary and secondary 1553 functions 210 and 212, a checking mechanism 214 and a memory for storing one or more error registers 216.

Primary and secondary 1553 function 210 and 212 each include the necessary functions to conform to MIL-STD-1553 for the purposes of properly formatting data to be written as messages onto 1553 Bus 140, and for reading and decoding message read from the bus. In addition, at least primary 1553 function 210 includes programming for operating the 1553 Bus 140 (as detailed below), with identical programming on the secondary 1553 function 212. The secondary 1553 function 212 will thus autonomously perform all functions performed on the primary 1553 function 210.

1553 Support Logic 122 comprises a primary memory 230 coupled to the primary 1553 function 202, and a secondary memory 232 coupled to the secondary 1553 function 212. 1553 Support Logic 122 further comprises a 1553 Transceiver 234 for communicating data messages via 1553 Bus 140.

In one embodiment, 1553 Self-Checking Logic device 120 is implemented using a field programmable gate array (FPGA). Because FPGA's vary in the on-board gate resources available, functions such as those supported by 1553 Support Logic 122 can be implemented as off-board functions such as shown in FIG. 2. In other embodiments, where resources permit, one or more of the functions described with respect to 1553 Support Logic 122 can be implemented within 1553 Self-Checking Logic device 120 itself.

In operation, in one embodiment, when 1553 Self-Checking Logic device 120 receives outgoing data for transmission from the master processor 112, that data is received both the primary 1553 function 210 and the secondary 1553 function 212. Primary 1553 function 210 places the outgoing data as it arrives into primary memory 230. Secondary 1553 function 212 writes the outgoing data as it arrives as a second copy into secondary memory 232. In addition, from within 1553 Self-Checking Logic device 120, the outgoing data received is echoed back to Checker Processor Self-Checking Pair Logic 115 so that it can verify that the data received by 1553 Self-Checking Logic device 120 from master processor 112 agrees with the data that checking processor 114 would have provided. If so, 1553 Self-Checking Logic device 120 will receive an instruction to transmit a MIL-STD-1553 formatted message onto the 1553 Bus 140 that carries the data.

To write the MIL-STD-1553 formatted message, primary 1553 function 210 will perform the function of operating the 1553 Bus 140. That is, primary 1553 function 210 will perform the necessary read, write and control transactions with the primary memory 230 and the necessary functions to provide the data to the 1553 Bus 140 via 1553 transceiver 234. Primary 1553 function 202 will read the outgoing data from primary memory 230 while secondary 1553 function 212 will read the second copy of the outgoing data from secondary memory 230. Both will then process the outgoing data to create a MIL-STD-1553 compliant message in lock-step fashion. Once a message is ready for transmission, the primary 1553 function 210 sends the message to 1553 Transceiver 134 to write the message to the 1553 Bus 140. Secondary 1553 function 212 also generates a message, but instead of sending that message to the 1553 Transceiver 134, it instead provides the message to checking mechanism 214. Checking mechanism 214 monitors the message being transmitted by primary 1553 function 210 and performs a bit-for-bit comparison with the message received from secondary 1553 function 212. When the messages generated by the two 1553 functions 210 and 212 agree, the message transmitted to the 1553 bus 140 is considered valid. When they do not agree, an error is reported to the error registers 216, discussed further below. In this way, 1553 Self-Checking Logic 120 verifies the integrity of all information it provides to the 1553 bus 140 and identifies when suspect data has been transmitted.

In addition to sending data over 1553 bus 140, Fault Tolerant Single Board Computer 110 also reads incoming data from the bus. For such read functions, 1553 Self-Checking Logic device 120 verifies the integrity of information being provided to the master processor 112 and checker processor 114. As before, primary 1553 function 210 is responsible for controlling the necessary transactions with 1553 Bus 140. As the 1553 transceiver 234 reads an incoming data message from 1553 bus 140, primary 1553 function 212 writes that information to primary memory 230. Secondary 1553 function 212 observes the data message being received by the primary 1553 function 212, and writes a second copy to the secondary memory 232. Once the incoming data has been received and saved, 1553 Self-Checking Logic device 120 informs the master processor 112 and checking processor 114 that incoming data from 1553 bus 140 has been received and is available. When it is ready for the data, master processor 112 will call on the 1553 Self-Checking Logic device 120 to read the incoming data from primary memory 230. On a read, the primary 1553 function 210 will read the received incoming data from primary memory 230 and send the requested data as a first data-set to master and checking processors 112 and 114. In the meantime the secondary 1553 function 212 will read the duplicate copy from secondary memory 232 and provides a second data-set to checking mechanism 214. Checking mechanism 214 monitors the data-set provided by primary 1553 function 210 and performs a bit-for-bit comparison with the data-set received from secondary 1553 function 212. When the data-sets from the two 1553 functions 210 and 212 agree, the data-set provided by the primary 1553 function 210 to the master and checking processors 112 and 114 is considered valid. When it does not agree, an error is reported by checking mechanism 214 to the error registers 216. In this way, 1553 Self-Checking Logic 120 verifies that incoming data from the messages receive via the 1553 bus 140 is being faithfully provided to the master and checking processors 112 and 114.

The support isolation and recovery the 1553 self-checking logic 112 includes error detection and error isolation registers to identify the address and bit that was determined to be in error. In one embodiment, when an error is identified by checking mechanism 214, that event is reported to the master and checking processors 112 and 114 and information about the error is stored in error registers 216. These registers latch when an error occurs. In one embodiment, they are only cleared by a processor write commend. Any error information written to a register requires an arm and fire scenario to assure protection from false reporting. Registers provided by error registers 216 include the RAM address identifying where the error occurred, the state of control signals from Processor Self-Checking Pair Logic 113, 115, the last 32 bits of data received or sent to the master processor 112, and the last 32 bits of data provided to checker processor 114. Depending on the nature of the error, different responses are appropriate. For example, if the error in the data appears to be caused by a transient event, the relevant operations may simply be repeated, or the data discarded. If the error appears to be caused by a more permanent fault such an equipment fault, communications may be switched to an alternate redundant data channel.

To support error injection for self-testing, in one embodiment additional registers are provided. Error insertion occurs at the input to the primary 1553 function 212 and/or secondary 1553 function 214 to create faulted data in either the primary or secondary memories 230, 232. The additional registers include a control register with redundant enable discrete, address and control registers to manipulate input to the 1553 functions 212, 214 and an XOR data filed to induce an error. As with the error reporting registers, writing to an error injection register requires an arm and fire scenario to assure protection from false error injection and reporting.

As would be appreciated by one of ordinary skill in the art, MIL-STD-1553 provides for redundancy such as through implementing independent redundant data channels on 1553 bus 140. As such, in some embodiments, 1553 Self-Checking Logic device 120 is implemented to operate on each of any redundant data channels available on 1553 bus 140 in the fashion described above. For example, in one embodiment, separate channels of primary and secondary 1553 functions, memories, checking mechanisms and error registers are provided for each data channel provided via the 1553 bus 140, each operating in the fashion described above.

FIGS. 3 and 4 are flow charts illustrating methods of embodiments of the present inventions. In alternate embodiments, methods described in FIGS. 3 and 4 may be utilized together and/or in any combination with the embodiments described above.

FIG. 3 is a flow chart illustrating a method for writing data to a MIL-STD-1553 serial data bus, such as 1553 bus 140. In one embodiment, the method of FIG. 3 is implemented using 1553 Self-Checking Logic device 120. As discussed above, when a processing device, such as a self-checking processor pair, has data to transmit to another device via the 1553 bus, the processing device first sends the device to the 1553 Self-Checking Logic device 120 which stores duplicate copies into independent primary and secondary memories. When the processing device indicates that the data is ready to send, the method begins at 310 with reading outgoing data from a primary memory and to 320 with reading a copy of the outgoing data from a secondary memory.

The method next proceeds to 330 with generating a first 1553 formatted message from the outgoing data from the primary memory and 340 with generating a second 1553 formatted message from the copy of the outgoing data from the secondary memory. In one embodiment, the first 1553 formatted message is generated by a first 1553 function while the second 1553 formatted message is generated by a second 1553 function that is operating in lock-step with the first 1553 function. As such, since the two 1553 functions are operating on what should be duplicate copies of the outgoing data, they should produce bit-by-bit identical 1553 formatted messages. The method then proceeds to 350 with sending the first 1553 formatted message to a 1553 transceiver for transmission to a 1553 serial bus. In one embodiment the first 1553 function controls the 1553 transceiver in order to operate the 1553 serial bus. The method next proceeds to 360 with checking the first 1553 formatted message as it is being sent to the 1553 transceiver against the second 1553 formatted message. Since the two messages should be bit-by-bit identical, when they are not, it is an indication that the first message written to the 1553 bus may contain an error. The method provides an indication of that error by proceeding to 370 with generating an error indication when the first 1553 formatted message does not match the second 1553 formatted message. A mention above, in one embodiment the error indication is stored by writing error data to one or more error registers.

In one embodiment, the outgoing data is stored into the primary and secondary memory by receiving the outgoing data from a self-checking processor, storing the outgoing data to the primary memory using a first logic circuit implementing a primary 1553 function and storing the outgoing data to the secondary memory via a second logic circuit implementing a secondary 1553 function. In order to verify the correct outgoing data was received from the self-checking processor, in one embodiment, the process includes echoing the outgoing data back to the self-checking processor pair. Once the self-checking concludes that the correct outgoing data will be sent, the process would proceed to 310 to start the self-checking method.

FIG. 4 is a flow chart illustrating a method for receiving data from a MIL-STD-1553 serial data bus, such as 1553 bus 140. In one embodiment, the method of FIG. 4 is implemented using 1553 Self-Checking Logic device 120. The method starts with duplicate copies of incoming data received from the 1553 bus stored in the primary and secondary memory. When the self-checking processor is ready to receive the data, the method proceeds to 410 with reading incoming data from the primary memory and to 420 with reading a copy of the incoming data from the secondary memory.

The method proceeds to 430 with generating a first data-set from the incoming data from the primary memory and to 440 with generating a second data-set from the copy of the incoming data from the secondary memory. In one embodiment, the first data-set is generated by a first 1553 function while the second 1553 formatted message is generated by a second 1553 function that is operating in lock-step with the first 1553 function. As such, since the two 1553 functions are operating on what should be duplicate copies of the incoming data, they should produce bit-by-bit identical data-sets. The process proceeds to 450 with writing the first data-set to a bus coupled to the self-checking processor pair and to 460 with checking the first data-set as it is being sent to the self-checking processor pair against the second data-set. Since the two data-sets should be bit-by-bit identical, when they are not, it is an indication that the first data-set sent to the self-checking processor pair may contain an error. The method provides an indication of that error by proceeding to 470 with generating an error indication when first data-set does not match the second data-set. In one embodiment the error indication is stored by writing error data to one or more error registers.

Several hardware means are available to implement the systems and methods of the current invention as discussed in this specification. These means include, but are not limited to, digital computer systems, microprocessors, application-specific integrated circuits (ASIC), programmable controllers and field programmable gate arrays (FPGAs), as well as embedded or discrete processors. Therefore other embodiments of the present invention are program instructions resident on computer readable media which when implemented by such means enable them to implement embodiments of the present invention. Computer readable media include any form of a physical computer memory device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A device for operating a 1553 serial data bus, the device comprising:
   a first logic circuit implementing a primary 1553 function, the first logic circuit coupled to a 1553 bus transceiver and a primary memory;
   a second logic circuit implementing a secondary 1553 function, the second logic circuit coupled to the 1553 bus transceiver and a secondary memory; and
   a checking mechanism coupled to the first logic circuit and the second logic circuit;
   wherein the first logic circuit and the second logic circuit are coupled to a self-checking processor pair;
   wherein when outgoing data for transmission over a 1553 bus via the 1553 bus transceiver is received from a master processor of the self-checking pair, the first logic circuit stores the outgoing data into the primary memory and the second logic circuit stores the outgoing data into the secondary memory;
   wherein the primary 1553 function formats the outgoing data stored in the primary memory into a first 1553 formatted message and operates the 1553 bus transceiver to write the first 1553 formatted message to the 1553 bus;
   wherein the secondary 1553 function formats the outgoing data stored in the secondary memory into a second 1553 formatted message;
   wherein the checking mechanism compares the first 1553 formatted message to the second 1553 formatted message and generates an error indication when the first 1553 formatted message does not match the second 1553 formatted message.

2. The device of claim 1, wherein the error indication includes error data written to one or more error registers.

3. The device of claim 1, further comprising a support logic circuit, wherein the support logic circuit includes one or more of the primary memory, the secondary memory and the 1553 transceiver.

4. The device of claim 1, wherein the first logic circuit, the second logic circuit and the checking mechanism are implemented in a field programmable gate array (FPGA).

5. The device of claim 1, wherein when an incoming message is received over the 1553 bus via the 1553 bus transceiver, the first logic circuit stores the incoming message into the primary memory and the second logic circuit stores the incoming message into the secondary memory.

6. The device of claim 5, wherein the primary 1553 function decodes a first data set from the incoming message as stored in the primary memory and transmits the first data set to the self-checking pair;
   wherein the secondary 1553 function decodes a second data set from the incoming message as stored in the secondary memory; and
   wherein the checking mechanism compares the first data set as transmitted to the self-checking pair with the second data set and generates an error message when compares the first data set as transmitted to the self-checking pair does not match the second data set.

7. The device of claim 1, wherein when outgoing data for transmission over the 1553 bus via the 1553 bus transceiver is received from the master processor of the self-checking pair, a copy of the outgoing data is echoed back to a self-checking pair logic for the self-checking pair.

8. A fault tolerant computer, the computer comprising:
   a self-checking processor pair that includes a master processor, a checking processor, and self-checking pair logic;
   a 1553 bus transceiver; and
   a device comprising 1553 self-checking logic coupled between the self-checking processor pair and the 1553 bus transceiver, wherein the 1553 self-checking logic manages data communication between the 1553 bus transceiver and the self-checking processor pair;
   wherein the 1553 self-checking logic includes a primary logic and a secondary logic that operate in lock-step;
   wherein when the 1553 self-checking logic writes data to the 1553 bus transceiver, the 1553 self-checking logic compares a first 1553 formatted message generated by the primary logic to a second 1553 formatted message generated by the secondary logic, and generates an error indication when the first 1553 formatted message does not match the second 1553 formatted message.

9. The computer of claim 8, when the 1553 self-checking logic transmits data received via the 1553 bus transceiver to the self-checking pair, the 1553 self-checking logic compares a first a first data-set generated by the primary logic to a second data-set generated by the secondary logic, and generates an error indication when the first data-set does not match the second data-set.

10. The computer of claim 8, the 1553 self-checking logic further comprising:
    a first logic circuit implementing a primary 1553 function, the first logic circuit coupled to the 1553 bus transceiver and a primary memory;
    a second logic circuit implementing a secondary 1553 function, the second logic circuit coupled to the 1553 bus transceiver and a secondary memory;
    a checking mechanism coupled to the first logic circuit and the second logic circuit;
    wherein the first logic circuit and the second logic circuit are coupled to the self-checking processor pair;

wherein when outgoing data is received from the self-checking pair, the first logic circuit stores the outgoing data into the primary memory and the second logic circuit stores the outgoing data into the secondary memory.

11. The computer of claim 10, wherein the primary 1553 function formats the outgoing data stored in the primary memory into a first 1553 formatted message and operates the 1553 bus transceiver to write the first 1553 formatted message to the 1553 bus;

wherein the secondary 1553 function formats the outgoing data stored in the secondary memory into a second 1553 formatted message;

wherein the checking mechanism compares the first 1553 formatted message to the second 1553 formatted message and generates the error indication when the first 1553 formatted message does not match the second 1553 formatted message.

12. The computer of claim 10, wherein when an incoming message is received over the 1553 bus via the 1553 bus transceiver, the first logic circuit stores the incoming message into the primary memory and the second logic circuit stores the incoming message into the secondary memory.

13. The computer of claim 10, wherein the primary 1553 function decodes a first data set from a incoming message as stored in the primary memory and transmits the first data set to the self-checking pair;

wherein the secondary 1553 function decodes a second data set from the incoming message as stored in the secondary memory; and wherein the checking mechanism compares the first data set as transmitted to the self-checking pair with the second data set and generates an error message when compares the first data set as transmitted to the self-checking pair does not match the second data set.

14. The computer of claim 10, further comprising a support logic circuit, wherein the support logic circuit includes one or more of the primary memory, the secondary memory and the 1553 transceiver.

15. The computer of claim 8, wherein the 1553 self-checking logic is implemented in a field programmable gate array (FPGA).

16. The computer of claim 8, wherein the error indication includes error data written to one or more error registers.

17. A method for checking 1553 bus data communication, the method comprising:

receiving outgoing data from a self-checking processing pair, the outgoing data to be transmitted to another device via the 1553 bus;

storing the outgoing data to a primary memory using a first logic circuit implementing a primary 1553 function;

storing the outgoing data to a secondary memory via a second logic circuit implementing a secondary 1553 function;

reading the outgoing data from the primary memory;

reading a copy of the outgoing data from the secondary memory;

generating a first 1553 formatted message from the outgoing data from the primary memory;

generating a second 1553 formatted message from the copy of the outgoing data from the secondary memory;

sending the first 1553 formatted message to a 1553 transceiver for transmission to a 1553 serial bus;

checking the first 1553 formatted message as it is being sent to the 1553 transceiver against the second 1553 formatted message; and generating an error indication when the first 1553 formatted message does not match the second 1553 formatted message.

18. The method of claim 17, further comprising:

reading incoming data from the primary memory;

reading a copy of the incoming data from the secondary memory;

generating a first data-set from the incoming data from the primary memory;

generating a second data-set from the copy of the incoming data from the secondary memory;

writing the first data-set to a bus coupled to the self-checking processor pair;

checking the first data-set as it is being sent to the self-checking processor pair against the second data-set; and generating an error indication when the first data-set does not match the second data-set.

19. The method of claim 17, further comprising:

echoing the outgoing data back to the self-checking processor pair.

20. The method of claim 17, wherein generating an error indication further comprising writing error data to one or more error registers.

* * * * *